Patented Feb. 19, 1952

2,585,936

UNITED STATES PATENT OFFICE 2,585,936

PROCESS FOR THE MANUFACTURE OF DI-QUATERNARY SALTS OF PYRIMIDYLA-MINOCINNOLINES

Walter Hepworth, Blackley, Manchester, England, and Francis Henry Swinden Curd, deceased, late of Blackley, Manchester, England, by Muriel Ruth Curd, executrix, Bramhall, England, assignors to Imperial Chemical Industries Limited, a corporation of Great Britain No Drawing. Application November 3, 1949, Serial No. 125,376. In Great Britain November 5, 1948

5 Claims. (Cl. 260—250)

This invention relates to new cinnoline derivatives and more particularly it relates to the manufacture of new diquaternary salts of pyrimidylaminocinnolines which are useful chemotherapeutic substances. In particular they possess valuable trypanocidal properties.

The said new compounds may be represented by the formula Pq—NH—Qq in which P stands for a 2-, 4- (or 6-) amino- or lower alkylamino-substituted pyrimidine nucleus which is attached to the linking —NH— group at another of the 2-, 4- (or 6-) positions and which may be further substituted in the remaining 2-, 4- (or 6-) position by a lower alkyl radical, an amino group, or a lower alkylamino group, Q stands for a cinnoline nucleus which is substituted in the 4-position by an amino group or a lower alkylamino group and which may be further substituted by a lower alkyl group or groups, and which bears the linking —NH— group in the 6-position and the symbols q indicate that the preceding nuclei, P and Q respectively, are present in the form of their quaternary salts.

It will be understood that although the new compounds in question are described herein as di-quaternary salts of pyrimidylaminocinnolines they can also be formulated and named as salts of mono-quaternary salts of dihydropyrimidyl-aminocinnolines or of pyrimidylaminodihydrocinnolines or again as di-salts of dihydropyrimidylaminodihydrocinnolines.

According to the invention there is provided a process for the manufacture of the said new substances of the formula Pq—NH—Qq wherein P, Q and q have the meaning hereinbefore stated, which comprises reacting one or more of the substances P—NH—Q, Pq—NH—Q and

P—NH—Qq with a quaternary salt-forming agent.

It will be understood that in reacting a substance of the formula P—NH—Q with a quaternary salt-forming agent the reaction may take place in a single stage or in two stages. That is to say one may obtain as an intermediate product one or both of the compounds Pq—NH—Q and P—NH—Qq, and it may be necessary to isolate the desired di-quaternary salt from a mixture of products.

As suitable quaternary salt-forming agents there are for example methyl iodide, dimethyl sulphate and methyl p-toluene sulphonate.

The reaction is carried out by heating the reactants together, conveniently in a solvent which may be for example ethyl alcohol, acetonitrile or nitrobenzene. Where the tendency for the formation of intermediate products is marked the process may advisedly be carried out in a solvent of high boiling point such as nitrobenzene, or, alternatively, if the solvent is of low boiling point, in a closed vessel under pressure. Where the quaternary salt-forming agent is a dialkyl sulphate it is convenient to use a dry non-hydroxylic solvent and dry nitrobenzene has been found to be particularly suitable for this purpose.

It is frequently convenient in isolation of the product to convert the quaternary salt to the salt of a different anion. Thus a dimethochloride may often conveniently be made by using as quaternary salt-forming agent dimethyl sulphate and then converting the resultant di-(metho-methyl sulphate) into the dimethochloride by the action of e. g. sodium chloride.

The invention is illustrated but not limited by the following examples in which the parts are by weight.

Example 1

2.8 parts of 4-amino-6-(2'-amino-6'-methylpyrimidyl-4'-amino)-cinnoline dihydrate are suspended in a mixture of 30 parts of nitrobenzene and 30 parts of benzene and the mixture is distilled until free from water. The temperature of the mixture is then raised gradually to 160° C. and is then cooled to 80° C. and 2.78 parts of dimethyl sulphate are added. The mixture is then heated and stirred at 95–100° C. for 2 hours. It is then cooled and filtered. The solid residue is washed with benzene, dried and dissolved in 70 parts of hot water. An excess of sodium iodide is then added and the mixture is filtered. The solid residue is dissolved in ethyl alcohol and sodium iodide is added. The mixture is then filtered and the residue is 4-amino-6-(2'-amino-6'-methylpyrimidyl-4'-amino)cinnoline 1:1'-dimethiodide which may be crystallised from water to give small yellow needles, M. P. 305° C. (decomp.).

The starting material used in the process of this example may be obtained as follows:

1.6 parts of 4:6-diaminocinnoline, 1.5 parts of 4-chloro-2-amino-4-methylpyrimidine, 20 parts of water and 2.4 parts of 35% aqueous hydrochloric acid are boiled together under reflux for one hour. The mixture is then cooled and filtered. The solid residue is crystallised from dilute aqueous hydrochloric acid and there is obtained 4-amino-6-(2'-amino-6'-methylpyrimidyl-4'-amino)-cinnoline dihydrochloride monohydrate, M. P. above 370° C.

2 parts of this hydrochloride are dissolved in 60 parts of water and the solution is made alkaline with aqueous sodium hydroxide and filtered. The solid is washed with water, dried and crystallised from aqueous 50% ethyl alcohol, and there is obtained 4-amino-6-(2'-amino-6'-methylpyrimidyl-4'-amino)-cinnoline dihydrate, M. P. 320° C. (decomp.).

*Example 2*

3 parts of 4-amino-6-(2'-amino-6'-methylpyrimidyl-4'-amino)-cinnoline 1'-methiodide dihydrate is dehydrated over phosphorus pentoxide at 160° C./0.03 mm. for 2 hours. 30 parts of dry nitrobenzene and 4 parts of dimethyl sulphate are then added and the mixture is stirred at 110° C. for 3 hours. It is then cooled and filtered. The solid is washed with benzene, dried and dissolved in 200 parts of ethyl alcohol. An excess of sodium iodide is added to the solution and the mixture is filtered. The solid is crystallised from water and there is obtained 4-amino-6-(2'-amino-6'-methylpyrimidyl-4'-amino)-cinnoline 1:1'-dimethiodide, M. P. 305° C. (decomp.).

*Example 3*

3 parts of 4-methylamino-6-(2'-methylamino-6'-methylpyrimidyl-4'-amino)cinnoline 1'-methiodide trihydrate is dehydrated over phosphorus pentoxide at 160° C./0.3 mm. for 2 hours. 30 parts of dry nitrobenzene and 4 parts of dimethyl sulphate are then added and the mixture is stirred at 110° C. for 3 hours. It is then cooled and filtered and the solid is washed with benzene, dried and dissolved in 50 parts of hot water. An excess of sodium iodide is added to the solution which is then cooled and filtered. The solid is crystallised from water and there is obtained 4-methylamino-6-(2'-methylamino-6'-methylpyrimidyl-4'-amino)cinnoline 1:1'-dimethiodide, M. P. 272–4° C.

*Example 4*

1 part of 4-amino-6-(2'-aminopyrimidyl-4'-amino)cinnoline 1-methiodide monohydrate is dehydrated over phosphorus pentoxide at 160° C./0.03 mm. for 4 hours. 10 parts of dry nitrobenzene and 5 parts of methyl-p-toluenesulphonate are then added and the mixture is stirred at 110° C. for 18 hours, cooled and filtered. The solid is washed with benzene, dried and crystallised from methyl alcohol when there is obtained 4-amino-6-(2'-aminopyrimidyl-4'-amino)cinnoline 1:1'-dimethyl-p-toluenesulphonate, M. P. 242–4° C.

The starting material used in the process of this example may be obtained as follows:

2.5 parts of 4:6-diaminocinnoline 1-methiodide, 1.3 parts of 4-chloro-2-aminopyrimidine and 20 parts of aqueous N-hydrochloric acid are boiled together under reflux for one hour. The mixture is then made alkaline with sodium carbonate and is filtered hot. To the filtrate 5 parts of sodium iodide are added and the mixture is then cooled and filtered. The solid is crystallised from water and there is obtained 4-amino-6-(2'-aminopyrimidyl-4'-amino)cinnoline 1-methiodide monohydrate, M. P. 320° C. (decomp.).

*Example 5*

1 part of 4-amino-6-(2'-amino-6'-methylpyrimidyl-4'-amino)-3-methyl-cinnoline 1'-methiodide dihydrate is dehydrated over phosphorus pentoxide at 160° C./0.03 mm. for 3 hours. 10 parts of nitrobenzene and 2 parts of dimethyl sulphate are then added and the mixture is stirred at 110° C. for 6 hours. The mixture is then cooled and excess acetone is added and the mixture filtered. The solid is crystallised from water and there is obtained 4-amino-3-methyl-6-(2'-amino-6'-methylpyrimidyl-4'-amino)cinnoline 1:1'-dimethiodide dihydrate, M. P. 284° C. (decomp.).

*Example 6*

0.75 part of 4-amino-6-(4'-aminopyrimidyl-2'-amino)cinnoline dihydrate is dehydrated over phosphorus pentoxide at 160–170° C./0.3 mm. for 3 hours. 10 parts of dry nitrobenzene and 5 parts of methyl p-toluenesulphonate are then added and the mixture is stirred at 110° C. for 18 hours. It is then cooled and 50 parts of acetone are added to it. The mixture is filtered and the solid is washed with acetone and dried. It is dissolved in 10 parts of water and 5 parts of sodium iodide are added. The solid is filtered off and crystallised from water and there is obtained 4-amino-6-(4'-aminopyrimidyl-2'-amino)cinnoline 1:1'-dimethiodide, M. P. 322° C. (decomp.).

The starting material used in the process of the above example may be obtained as follows:

1 part of 4:6-diaminocinnoline is dissolved in aqueous N-hydrochloric acid and 0.8 part of 2-chloro-4-aminopyrimidine is added. The mixture is boiled under reflux for 1 hour, cooled and filtered. The solid is washed with acetone, dried and crystallised from water and there is obtained 4-amino-6-(4'-amino-pyrimidyl-2'-amino)cinnoline dihydrochloride, M. P. above 360° C.

This hydrochloride is dissolved in water and the solution is made alkaline with aqueous sodium hydroxide and filtered. The solid is washed with water and dried. It is crystallised from 50% aqueous ethyl alcohol and there is obtained 4-amino-6-(4'-aminopyrimidyl-2'-amino)cinnoline dihydrate, M. P. 260° C.

*Example 7*

1 part of 4-amino-6-(2'-isopropylamino-6'-methylpyrimidyl-4'-amino)cinnoline 1'-methiodide trihydrate is dehydrated over phosphorus pentoxide at 160–170° C./0.3 mm. for 3 hours. 10 parts of nitrobenzene and 5 parts of methyl p-toluenesulphonate are then added and the mixture is stirred at 110° C. for 18 hours. It is then cooled and 50 parts of acetone are added. The mixture is filtered and the solid is washed with acetone and dried. It is then dissolved in 15 parts of water and 10 parts of sodium iodide are added. The solid is filtered off and crystallised from water when there is obtained 4-amino-6-(2'-isopropylamino-6'-methylpyrimidyl-4'-amino)cinnoline 1:1'-dimethiodide, M. P. 320° C. (decomp.).

We claim:

1. A process for the manufacture of diquaternary salts of pyrimidylaminocinnolines of the general formula:

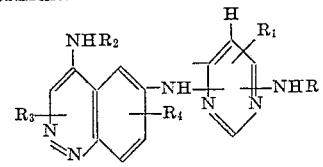

wherein $R_1$ is a radical from the group consisting of lower alkyl and —NHR; R and $R_2$ are radicals from the group consisting of hydrogen and lower alkyl; and $R_3$ and $R_4$ are radicals from the group consisting of hydrogen and lower alkyl, which comprises reacting a cinnoline derivative from the group consisting of compounds of the general formula above given and the monoquaternary salts thereof with a quaternary salt forming agent.

2. A process as claimed in claim 1 wherein said salt forming agent is methyl iodide.

3. A process as claimed in claim 1 wherein said salt forming agent is dimethyl sulphate.

4. A process as claimed in claim 1 wherein said salt forming agent is methyl p-toluene sulphonate.

5. A process as claimed in claim 1 wherein said reaction is brought about by heating the reactants together in the presence of a solvent.

WALTER HEPWORTH,
MURIEL RUTH CURD,
*Executrix of the Estate of Francis Henry Swinden Curd, Deceased.*

No references cited.